(12) United States Patent
Takahara et al.

(10) Patent No.: US 7,435,302 B2
(45) Date of Patent: Oct. 14, 2008

(54) SURFACE TREATMENT APPARATUS AND METHOD FOR MANUFACTURING LIQUID CRYSTAL DISPLAY DEVICE

(75) Inventors: Yoichi Takahara, Yokohama (JP);
Masahiro Yamada, Yokohama (JP);
Noriyuki Ohroku, Yokohama (JP);
Shoji Asaka, Hanno (JP); Tomoaki Takahashi, Mobara (JP); Hiroshi Kawanago, Yokohama (JP); Hideaki Yamamoto, Tokorozawa (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 695 days.

(21) Appl. No.: 10/914,219

(22) Filed: Aug. 10, 2004

(65) Prior Publication Data
US 2005/0067104 A1    Mar. 31, 2005

(30) Foreign Application Priority Data
Sep. 30, 2003    (JP) .............................. 2003-340626

(51) Int. Cl.
*B08B 1/00*    (2006.01)
(52) U.S. Cl. ................ 134/6; 134/9; 134/15; 134/25.4; 134/25.5; 134/32; 134/33; 134/42; 134/902; 15/77; 15/88.3

(58) Field of Classification Search ................. 15/77, 15/88.3; 134/6, 9, 15, 25.5, 25.4, 32, 33, 134/42, 902
See application file for complete search history.

(56) References Cited

U.S. PATENT DOCUMENTS 2,962,147 A * 11/1960 Klyce ..................... 192/142 R

FOREIGN PATENT DOCUMENTS

JP    10-135167    5/1998

* cited by examiner

*Primary Examiner*—Sharidan Carrillo
(74) *Attorney, Agent, or Firm*—Antonelli, Terry, Stout & Kraus, LLP.

(57) ABSTRACT

A cleaning apparatus according to the present invention is provided with a brush drive mechanism which brings a brush being rotating closer to a substrate, measures electrical potentials generated on a plurality of conductor patterns formed on the substrate, by a contact and separation with/from tips of scrub materials of the brush being rotating, and controls a positioning of the brush by use of the measurement results. With the process as described above, it is possible to treat uniformly a surface to-be-cleaned for a large-sized substrate, with the cleaning brush. Consequently, it is possible to form a highly qualified transistor for liquid crystal display on the substrate having been cleaned, with enhancing yield.

3 Claims, 12 Drawing Sheets

FIG.11

| BRUSH HEIGHT (mm) | MEASURED POSITION | | |
|---|---|---|---|
| | $72A_1$ | $72A_2$ | $72A_3$ |
| 0.6 | NON-CONTACT | NON-CONTACT | NON-CONTACT |
| 0.4 | NON-CONTACT | NON-CONTACT | NON-CONTACT |
| 0.2 | NON-CONTACT | NON-CONTACT | NON-CONTACT |
| 0.0 | NON-CONTACT | CONTACT | NON-CONTACT |
| −0.2 | NON-CONTACT | CONTACT | NON-CONTACT |
| −0.4 | NON-CONTACT | CONTACT | NON-CONTACT |
| −0.6 | CONTACT | CONTACT | CONTACT |

SURFACE TREATMENT APPARATUS AND METHOD FOR MANUFACTURING LIQUID CRYSTAL DISPLAY DEVICE

BACKGROUND OF THE INVENTION

The present invention relates to a technique for manufacturing a product including a substrate, and more particularly, it relates to a surface treatment technique in which a surface treatment on the substrate is performed with a rotary member.

The Japanese Patent Laid-open Publication No. H10-135167 discloses, as a way of example, a cleaning apparatus which performs a scrub cleaning with a disk type brush, on a surface to-be-cleaned of a glass substrate or the like, which is used for a liquid crystal display device. To ensure a constant cleaning effect by the scrub cleaning with the brush, it is necessary to precisely adjust a depth of compression of the brush against the surface to-be-cleaned of the substrate. In consideration of this situation, the cleaning apparatus, described in the Japanese Patent Laid-open Publication No. H10-135167 is provided with a pressure sensor having a pressure sensing face positioned at a height differing by Δh higher from the surface to-be-cleaned.

Prior to cleaning the substrate, the disk type brush at the end of an arm is allowed to abut against the pressure sensing face of the pressure sensor, and height information X of the arm is inputted at the time when the sensed pressure of the pressure sensor reaches a reference pressure. While cleaning the substrate, a drive shaft of the arm is controlled so that the arm is positioned lower than the previously inputted height information X by the predetermined height Δh. Accordingly, it is possible to control the depth of compression of the disk type brush against the surface to-be-cleaned, so that the pressure against the surface to-be-cleaned given by the disk type brush is to be the reference pressure.

SUMMARY OF THE INVENTION

However, while cleaning the substrate, if the cleaning brush slants with respect to the surface to-be-cleaned, it causes a difference in the depth of compression with respect to the surface to-be-cleaned of the substrate, between at one end and at the other end of the cleaning brush. Therefore, variations in cleaning effect may occur on the surface to-be-cleaned of the substrate.

In order to solve the problem, an object of the present invention helps provide a surface treatment apparatus which is capable of treating the surface to-be-treated uniformly, with a rotary member having a plurality of bristles.

The present invention provides a surface treatment apparatus comprising, a drive means which moves a member having a shaft and a plurality of bristles whose tips are oriented to a direction separating from a peripheral surface of the shaft, into a direction for narrowing a distance between a first and a second conductor (conductor of electricity) patterns and the shaft, while the member is rotated around the shaft, the first and the second conductor patterns being arranged within one plane of a substrate along the shaft, and an electrical potential measurement means which measures an electrical potential with respect to each of the first and the second conductor patterns, which are electrically charged by a contact with the bristles of the member being rotating.

According to the present invention, it is possible to perform a surface treatment uniformly on the surface to-be-treated by use of the rotary member.

BRIEF DESCRIPTION OF THE DRAWINGS

These and other features, objects and advantages of the present invention will become more apparent from the following description when taken in conjunction with the accompanying drawings wherein:

FIG. 11 is a chart showing a result of checking a height of brush and a contact status between the brush and the substrate, by changing points of measurements.

DETAILED DESCRIPTION OF PREFERRED EMBODIMENTS

Hereinafter, preferred embodiments of the present invention will be explained with reference to the attached drawings.

At first, a substrate for adjustment relating to the present embodiment will be explained. For ease of explanation, the thickness direction of the substrate for adjustment is assumed as Z-direction, and two width directions thereof are assumed as X-direction and Y-direction.

Figure 3:
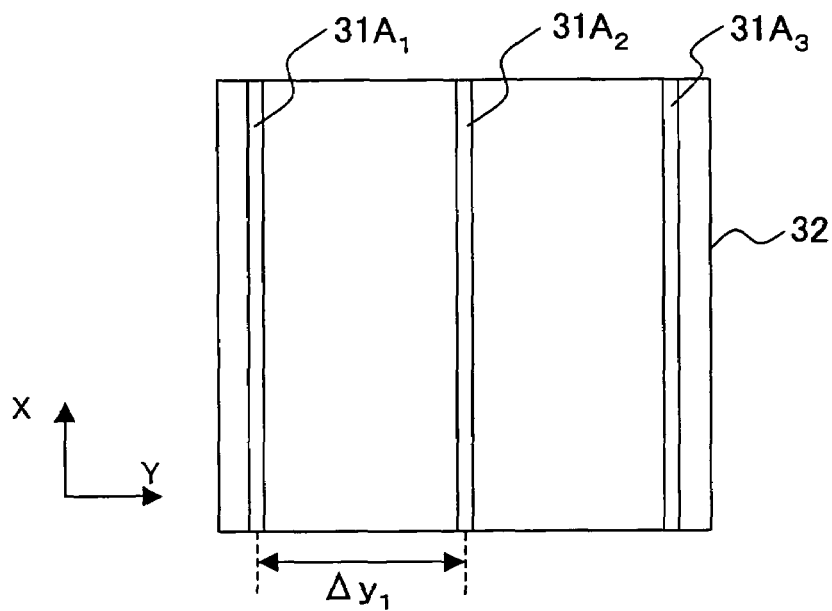
FIG. 3 is a front view of a substrate for adjustment used in carrying out the present invention.

As shown in FIG. 3, the substrate for adjustment 30 relating to the present embodiment comprises a plate type base material 32 made of a glass and the like, and a plurality of conductor patterns $31A_1$ to $31A_3$, which are formed with appropriate intervals $\Delta y_1$ along the Y-direction within at least one plane of the base material 32. Each of the conductor patterns $31A_1$ to $31A_3$ extends along the X-direction from one end to the other end of the base material 32. Specific examples of materials forming these conductor patterns $31A_1$ to $31A_3$ may include Al, Cr, Mo, Ta, W, Cu, Ti, Nd, Zr, In, Sn, Zn and the like.

FIG. 3 shows a case where three conductor patterns $31A_1$ to $31A_3$ are formed on the base material 32, but the number of conductor patterns formed on the base material 32 is not necessarily three. For example, more conductor patterns may be formed on the spaces between the conductor patterns $31A_1$ and $31A_2$ or $31A_2$ and $31A_3$. Furthermore, if it is not necessary to determine at what timing the cleaning brush needs replacing or the like, according to the output from the electrical potential measurement devices in position correction processing described later, the conductor pattern $31A_2$ formed in the middle of the three conductor patterns $31A_1'$ to $31A_3'$ may be removed.

Figure 4:
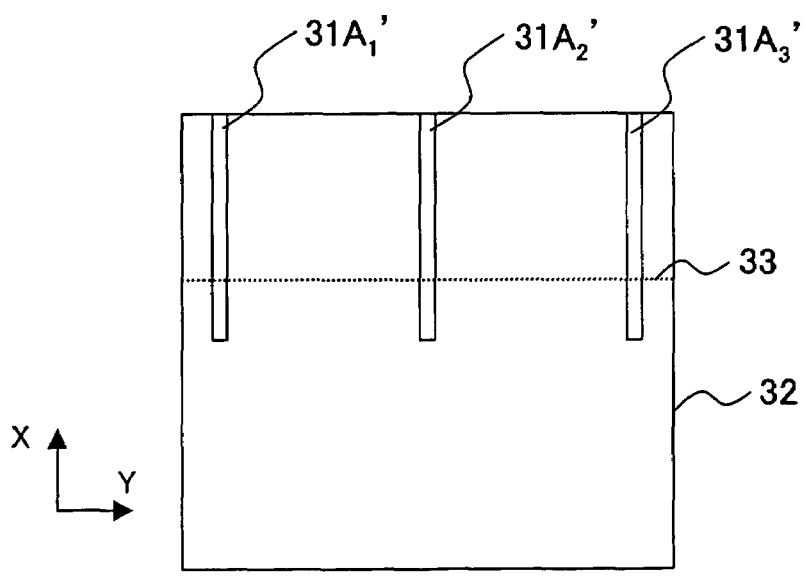
FIG. 4 is a front view of a substrate for adjustment having a structure different from the substrate as shown in FIG. 3.

Further in FIG. 3, the conductor patterns $31A_1$ to $31A_3$ extending from one end to the other end of the base material 32 are formed. However, as shown in FIG. 4, as far as line 33 cutting across the base material 32 in the Y-direction intersects with all the conductor patterns $31A_1'$ to $31A_3'$, the length of each of the conductor patterns $31A_1$ to $31A_3$ may be shorter than the X-direction width of the base material 32.

Next, the configuration of the surface treatment apparatus relating to the present embodiment will be explained with an example where a substrate for adjustment 30 is set instead of a treatment target substrate. It is to be noted here that a cleaning apparatus will be described as a way of example of the surface treatment apparatus.

Figure 1:
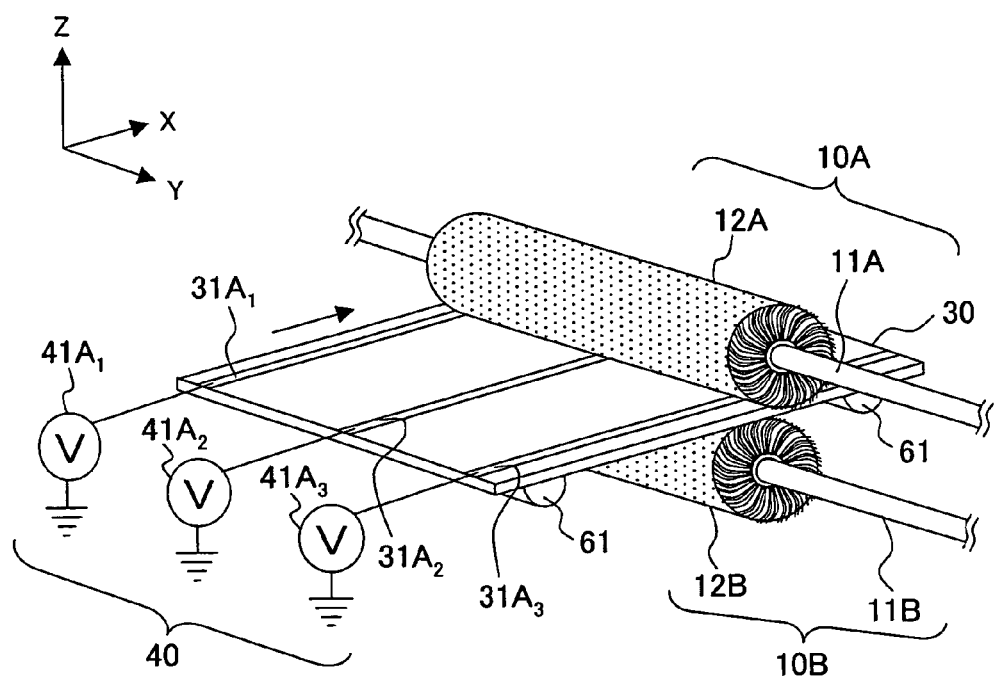
FIG. 1 is a schematic diagram to explain a configuration of a cleaning apparatus of the present invention.
Figure 2:
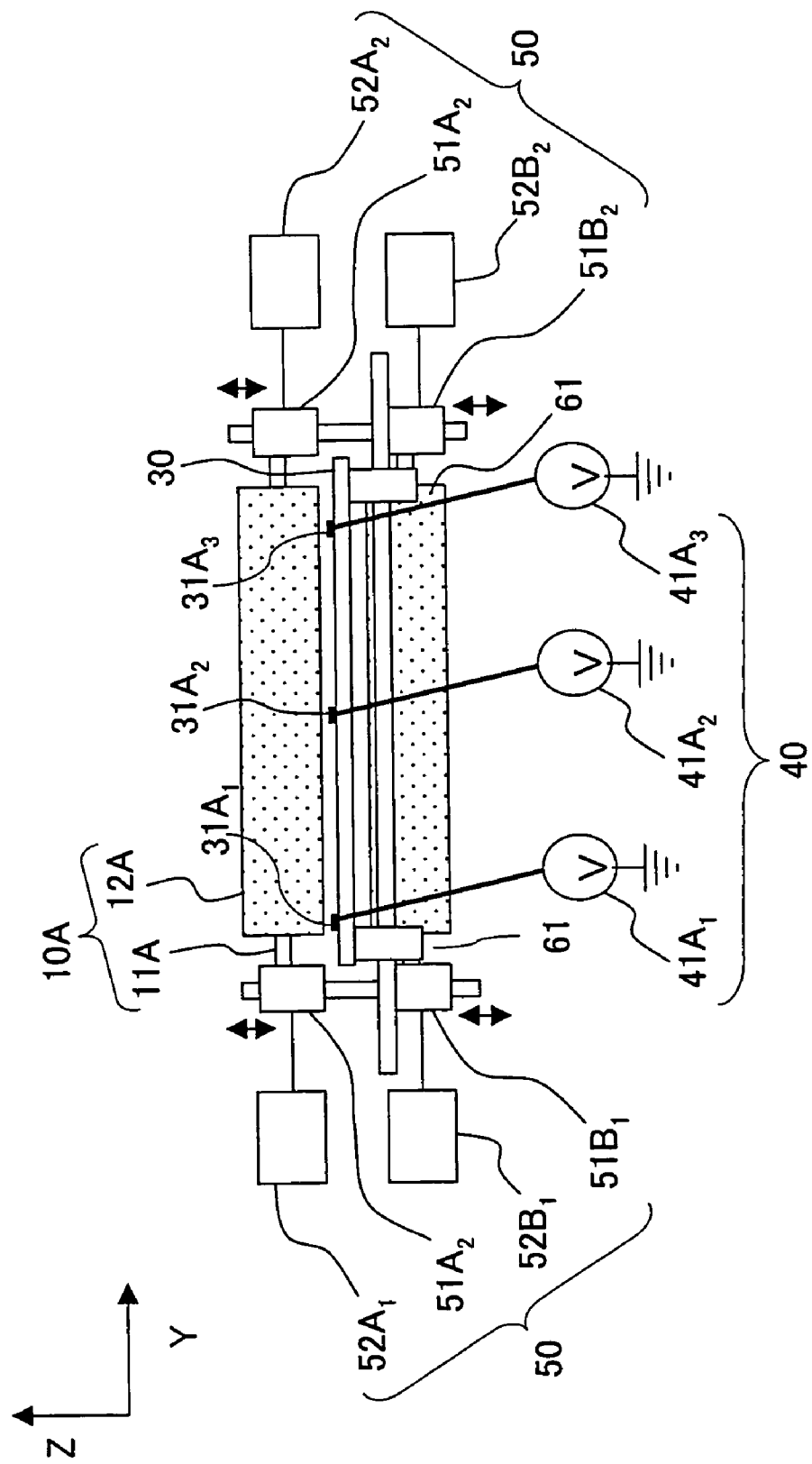
FIG. 2 is a schematic diagram of the cleaning apparatus as explained in FIG. 1, showing a block diagram of the apparatus viewed from electrical potential measurement devices side.

As shown in FIG. 1 and FIG. 2, the cleaning apparatus relating to the present embodiment comprises a substrate carrier mechanism which carries the substrate for adjustment 30 to the X-direction, a pair of roll-like cleaning brushes 10A and 10B provided vertically, being arranged with a distance there between so as to allow the substrate for adjustment 30 to pass through, a brush drive mechanism 50 which rotates and moves each of the cleaning brushes 10A and 10B, and a contact detecting section 40 which detects a contact between the substrate for adjustment 30 and the cleaning brush 10A or 10B. For ease of explanation, three directions of XYZ directions similar to those in FIG. 3 are also defined in FIG. 1 and FIG. 2.

The substrate carrier mechanism comprises multiple pairs of carrier rollers 61 which come into contact with the substrate for adjustment 30 and a motor (not illustrated) for rotating each pair of the carrier rollers 61 around the Y-direction axis. According to the substrate carrier mechanism, it is possible to rotate each pair of the carrier rollers 61, whereby the substrate for adjustment 30 is moved towards the space between the cleaning brushes 10A and 10B along the X-direction.

The cleaning brushes 10A and 10B respectively comprise shafts 11A and 11B arranged along the Y-direction, and scrub materials 12A and 12B placed around the peripheral surfaces of the shafts 11A and 11B respectively. Each of the scrub materials 12A and 12B is made of a fabric material on which bundles of dielectric fibers are implanted with an appropriate degree of density, which are electrically charged by contacting the conductor patterns $31A_1$ to $31A_3$ of the substrate for adjustment 30. Such fibers may be nylon (registered trademark), acryl and the like, for example. Length of each bundle of fibers is precisely aligned appropriately (for example, around 1 to 3 cm).

The brush drive mechanism 50 comprises a motor (not illustrated) for rotating the brushes 10A and 10B respectively around axes of the shafts 11A and 11B, feed screws for adjustment $51A_1$ and $51A_2$, which respectively move ends of the shaft 11A of the cleaning brush 10A into the Z-direction, feed screws for adjustment $51B_1$ and $51B_2$, which respectively move ends of the shaft 11B of the cleaning brush 10B in the Z-direction, motors $52A_1$, $52A_2$, $52B_1$ and $52B_2$, which respectively drive the feed screws for adjustment $51A_1$, $51A_2$, $51B_1$ and $51B_2$. With the brush drive mechanism as described above, while the cleaning brushes 10A and 10B are rotated, it is possible to adjust the slant of each cleaning brush 10A, 10B with respect to the substrate for adjustment 30, by use of each feed screw for adjustment.

The contact detecting section 40 comprises electrical potential measurement devices $41A_1$ to $41A_3$, the number of which corresponds to that of the conductor patterns $31A_1$ to $31A_3$ on one side of the substrate for adjustment 30. These electrical potential measurement devices $41A_1$ to $41A_3$ are respectively connected with the conductor patterns $31A_1$ to $31A_3$ on the substrate for adjustment 30. In this state, when contact and separation (friction) occur between the scrub material of the cleaning brush being rotating and each of the conductor patterns $31A_1$ to $31A_3$ of the substrate for adjustment 30, each of the electrical potential measurement devices $41A_1$ to $41A_3$ detects an electrical potential generated by the contact charging at the conductor patterns $31A_1$ to $31A_3$.

Figure 5:
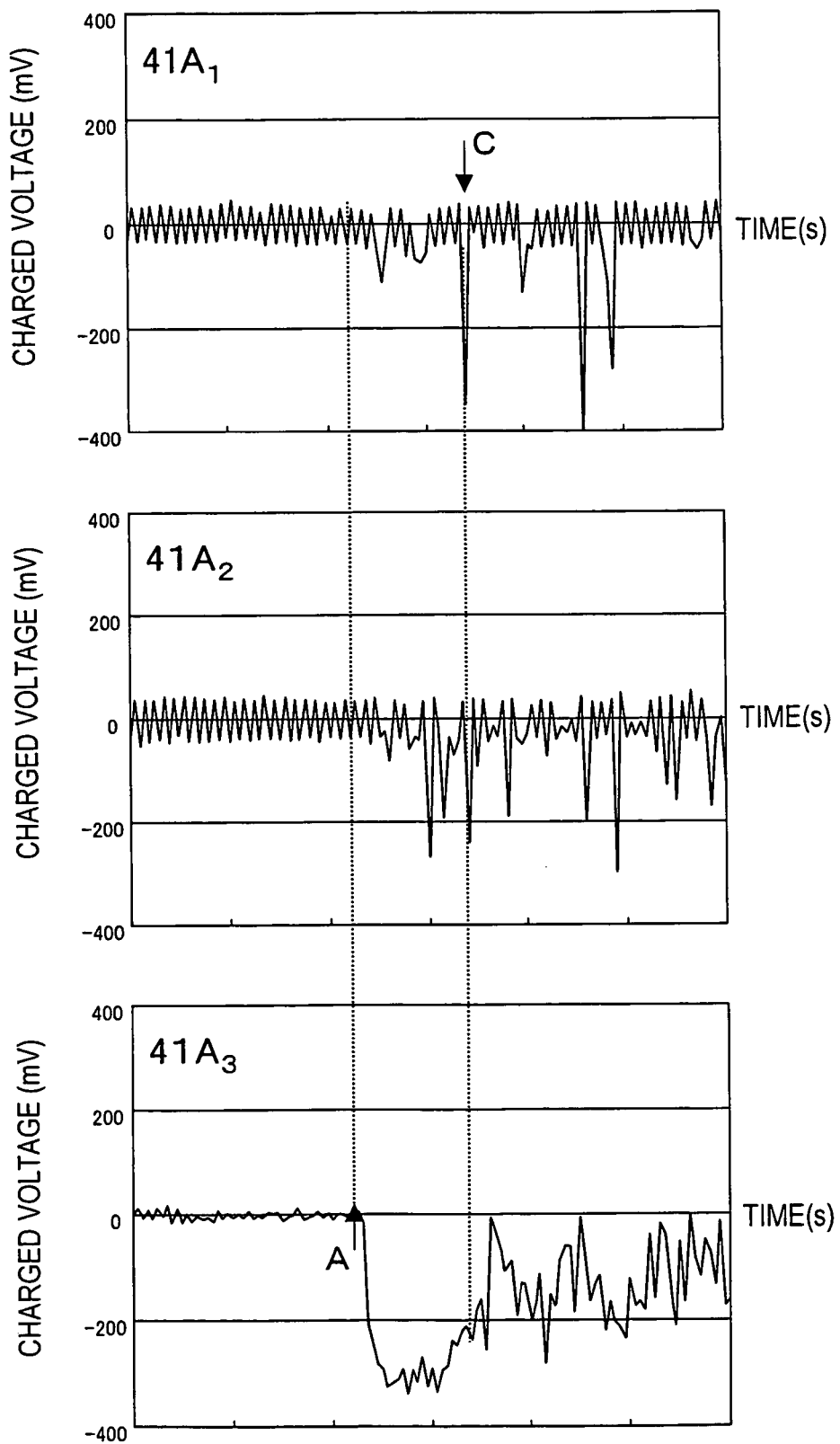
FIG. 5 shows graphs to explain output signals respectively from the electrical potential measurement devices in the cleaning apparatus as explained in FIG.

If the distance between the substrate for adjustment 30 and the tip of the scrub material of the cleaning brush is not uniform, time lag occurs in a variation timing of the detected electrical potential of each of the electrical potential measurement devices $41A_1$ to $41A_3$ (see FIG. 5). Therefore, by monitoring the detected electrical potential as to each of the electrical potential measurement devices $41A_1$ to $41A_3$, it can be determined whether or not the distance between the substrate for adjustment 30 and the tip of the scrub material of the cleaning brush is non-uniform.

Next, a position correction processing as to each of the cleaning brushes 10A and 10B, utilizing the substrate for adjustment 30, will be explained.

(1) Decision of the electrical potential variation range (hereinafter, referred to as "reference range"), which is a reference to determine whether or not there has been a contact between the scrub material and the conductor pattern.

The substrate for adjustment 30 as shown in FIG. 3 is set in the substrate carrier mechanism 60 in such a manner that the surface on which the conductor patterns $31A_1$ to $31A_3$ are formed is facing upward. Then, the substrate for adjustment 30 is carried up to the position just in front of the cleaning brushes 10A and 10B. At this stage, the cleaning brushes 10A and 10B are arranged at an appropriate height so that the cleaning brushes do not come into contact with the substrate for adjustment 30 disposed on the rollers 61 in the substrate carrier mechanism 60.

Thereafter, an electrical potential measurement device of the contact detecting section 40 is connected to at least one conductor pattern out of the conductor patterns $31A_1$ to $31A_3$ on the substrate for adjustment 30. For the sake of simplicity, it is assumed here that the electrical potential measurement device $41A_1$ is connected to the conductor pattern $31A_1$. After the completion of connecting the electrical potential measurement device, the cleaning brushes 10A and 10B are started to rotate, and then, the substrate for adjustment 30 is resumed to move forward. Subsequently, the substrate for adjustment 30 is stopped at a place where the conductor patterns $31A_1$ to $31A_3$ are positioned between the cleaning brushes 10A and 10B which are rotating (see FIG. 1 and FIG. 2).

Then, by adjusting each of the feed screws for adjustment $51A_1$ and $51A_2$ on both ends of the cleaning brush 10A, the cleaning brush 10A is gradually brought closer to the substrate for adjustment 30. When a variation is found in the detected electrical potential in the electrical potential measurement device $41A_1$, the cleaning brush 10A is firstly lifted up, and then a thickness gage, a thickness of 0.1 mm, is inserted between the substrate for adjustment 30 and the cleaning brush 10A in such a manner as sliding on the conductor pattern $31A_1$.

When the scrub material 12A of the cleaning brush 10A comes into contact with the thickness gage, it is determined that there has been a physical contact between the scrub material 12A of the cleaning brush 10A and the conductor pattern $31A_1$. As thus described, a processing as described above is repeated for appropriate number of times. That is, the processing is that the cleaning brush 10A is gradually brought closer to the substrate for adjustment 30, and when a potential variation appears in the electrical potential measurement device, the cleaning brush 10A is lifted up for a predetermined distance and a thickness gage of a predetermined thickness is inserted therebetween.

Figure 6:
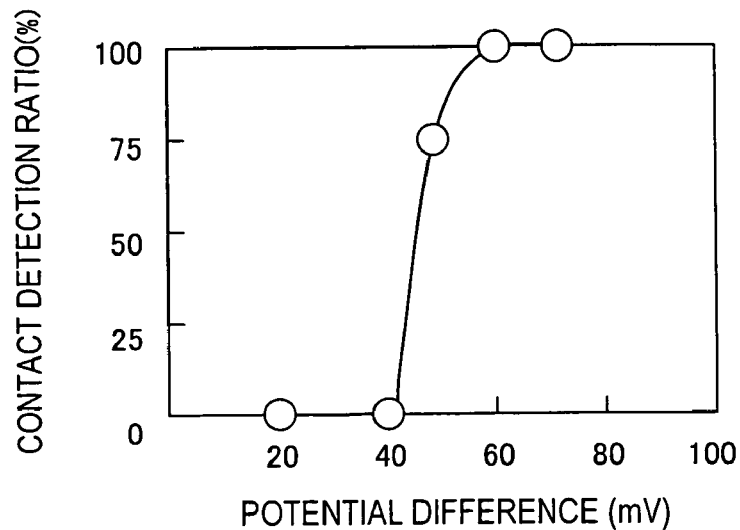
FIG. 6 is an explanatory view for explaining a ratio of ensured contacts between the cleaning brush and the substrate, being associated with detected electrical potentials from the electrical potential measurement device.

Then, for every range of electrical potential variation appeared in the electrical potential measurement device $41A_1$, the number of detections as to the physical contact between the conductor pattern $31A_1$ and the scrub material 12A is summarized, and the reference range is decided based on the result of the summary. Whether or not there has been a contact between the scrub material 12A made of nylon and the pattern made of aluminum is detected, and a result from every ten times of detection with respect to each electrical potential variation range is shown in FIG. 6.

According to the summary result, when there appears a potential change of 60 mV or more, it is certainly confirmed that there has been a contact between the conductor pattern $31A_1$ and the scrub material 12A. On the other hand, FIG. 6 shows that when there appears a potential change of less than 60 mV, the contact between the conductor pattern $31A_1$ and the scrub material 12A is not necessarily confirmed. Therefore, it is possible to set the reference range to 60 mV, when the conductor pattern is made of Al and the scrub member is made of nylon.

If the reference range is clearly defined in advance with respect to the relationship between the material used for the scrub material and the material used for the conductor pattern, it is not necessary to carry out the processing as described above.

(2) Position Correction of the Cleaning Brush 10A

Figure 12:
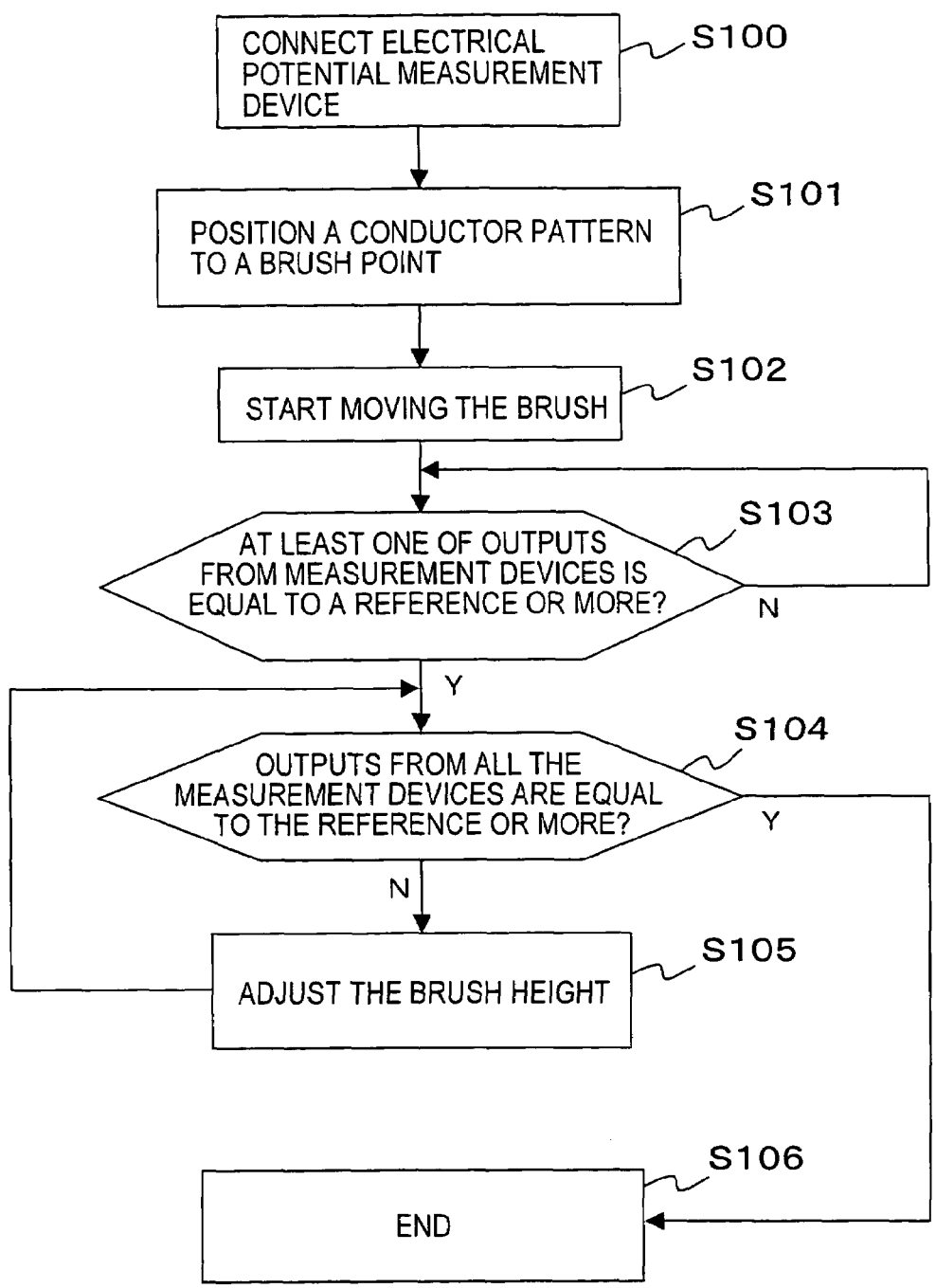
FIG. 12 is a flowchart for explaining a method regarding a position correction process of the cleaning brush.

FIG. 12 shows a flowchart of the position correction processing for the cleaning brush 10A.

The substrate for adjustment 30 as shown in FIG. 3 is set in the substrate carrier mechanism 60 in such a manner that the surface on which the conductor patterns $31A_1$ to $31A_3$ are formed is facing upward. Then, the substrate for adjustment 30 is carried up to the position just in front of the cleaning brushes 10A and 10B. At this stage, the cleaning brushes 10A and 10B are arranged at an appropriate height so that the cleaning brushes do not come into contact with the substrate for adjustment 30 disposed on the rollers 61 in the substrate carrier mechanism 60.

Subsequently, the electrical potential measurement devices $41A_1$ to $41A_3$ of the contact detecting section 40 are connected to the conductor patterns $31A_1$ to $31A_3$ of the substrate for adjustment 30, respectively one by one (S100). After the completion of connecting the electrical potential measurement devices $41A_1$ to $41A_3$, the cleaning brushes 10A and 10B are started to rotate, and then, the substrate for adjustment 30 is resumed to move forward. Thereafter as shown in FIG. 1 and FIG. 2, the substrate for adjustment 30 is stopped at a place where the conductor patterns $31A_1$ to $31A_3$ are positioned between the cleaning brushes 10A and 10B which are rotating (S101). Then, by adjusting each of the feed screws $51A_1$ and $51A_2$ of the cleaning brush 10A, the cleaning brush 10A is gradually brought closer to the substrate for adjustment 30 (S102).

In the process of bringing the cleaning brush 10A closer to the substrate for adjustment 30, an operator monitors the electrical potential detected in each of the electrical potential measurement devices $41A_1$ to $41A_3$. While monitoring, if it is determined that a variation of the reference range or more has appeared in the detected electrical potential of at least one of the electrical potential measurement devices (S103) the following processing is performed.

When it is determined that a variation of the reference range or more has appeared in the detected electrical potential of all the electrical potential measurement devices (S104), the position correction of the cleaning brush 10A is completed (S106).

On the other hand, when it is determined that a variation of the reference range or more has appeared in the detected electrical potential of a part of the electrical potential measurement devices (S104), any of the following processing for adjusting the cleaning brush 10A is performed depending on in which electrical potential measurement device the variation has appeared (S105).

It is understood that only the conductor pattern $31A_2$, which is positioned around the center of the substrate for the adjustment 30, is in contact status in the case where there is found a variation of the reference range or more only in the detected electrical potential of the electrical potential measurement device $41A_2$, which is connected to the conductor pattern $31A_2$ other than the both sides of the conduct pattern lines. Alternatively, in the case where there is found no variation of the reference range or more in the detected electrical potential of the electrical potential measurement device $41A_2$ only, the conductor pattern $31A_2$, which is positioned around the center of the substrate for the adjustment 30, is only in non-contact status. This indicates that there is a possibility of deterioration (deformed, scraped away and the like) as to bristles of the scrub material 12A due to usage of long period of time. Therefore, replacement of the cleaning brush 10A or bristle adjustment of the scrub material 12A is required when there is found a variation of the reference range or more only in the electrical potential outputted from the electrical potential measurement device $41A_2$, or there is not found such a variation in the electrical potential outputted from the electrical potential measurement device $41A_2$ only.

If there appears a variation of the reference range and more in the electrical potential in only either one of the electrical potential measurement devices $41A_1$ and $41A_3$, which are respectively connected to the conductor patterns $31A_1$ and $31A_3$ on both ends of the conductor pattern lines, only the conductor pattern as a connection target of the pertinent electrical potential device contacts and separates from the scrub material 12A of the cleaning brush 10A.

Therefore, when there appears a variation of the reference range and more in either one of the electrical potential measurement devices, the operator stops adjusting the feed screw on the side of the conductor pattern which is connected to the pertinent electrical potential device out of the feed screws for adjustment $51A_1$ and $51A_2$. Then, a position of one end of the cleaning brush 10A which comes into contact with the substrate for adjustment 30 is stabilized, and only the other end of the cleaning brush 10A which does not contact the substrate for adjustment 30 is further brought closer to the substrate for adjustment 30.

Accordingly, if there appears a variation of the reference range and more also both in the detected electrical potential of the other electrical potential devices (S104), it indicates that the tip of the scrub material from the end to the other end of the cleaning brush 10A get into contact with the substrate for adjustment 30 (that is, the distance between the substrate for adjustment 30 and the tip of the scrub material is uniform). Therefore, adjustment of the feed screw, which is in a course of adjusted, is stopped (S106). It is to be noted that the steps from S102 to S106 can be repeated again after the cleaning brush 10A is set apart from the substrate for adjustment 30, by turning the feed screws for adjustment $51A_1$ and $51A_2$ for the same number of times.

For example, as shown in FIG. 5, during the adjustment of the both feed screws for adjustment $51A_1$ and $51A_2$, if there appears a variation of the reference range or more only in the detected electrical potential from the electrical potential measurement device $41A_3$, it indicates that there is a contact and separation between only the conductor pattern $31A_3$ and the scrub material 12A of the cleaning brush 10A. Therefore, at the timing of A, the adjustment of only the feed screw $51A_2$ on the side of the conductor pattern $31A_3$ is stopped. Afterwards, the adjustment of only the other feed screw $51A_1$ is continued, and when there appears a variation of the reference range or more in the detected electrical potential from all the other electrical potential measurement devices $41A_1$, $41A_2$, the adjustment of the feed screw $51A_1$ is also stopped at the timing C.

Accordingly, the posture of the cleaning brush 10A is corrected so that the slant of the cleaning brush 10A with respect to the substrate for adjustment 30 becomes less steep, whereby the tip of the scrub material 12A of the cleaning brush 10A can be brought into contact with the entire substrate for adjustment 30 uniformly in the width of Y-direction.

In FIG. 4, there is shown a case where negative electrical potential is generated by a contact charging with the scrub material. However, the polarity of the electrical potential generated on the conductor pattern by the contact charging with the scrub material is different depending on a combination between the material of the scrub material and the material of the conductor pattern. For example, when the conductor pattern is made of Al and the scrub material is made of nylon, negative electrical potential is generated on the conductor pattern. Alternatively, if the conductor pattern is made of Cr and the scrub material is made of nylon, positive electrical potential is generated on the conductor pattern.

(3) Position Correction of the Cleaning Brush 10B

When the position correction of the cleaning brush 10A is completed, the substrate for adjustment 30 is allowed to slide back, and then it is turned upside down. Subsequently, the processing similar to the position correction applied to the cleaning brush 10A is performed. Accordingly, the posture of the cleaning brush 10B is corrected so that the slant of the cleaning brush 10B with respect to the substrate for adjustment 30 is less steep. If a substrate for adjustment, both sides on which the conductor patterns are formed is used, it is not necessary to turn the substrate upside down at this stage.

The position correction processing for the cleaning brushes 10A and 10B as described above is executed prior to performing a cleaning process on the cleaning target substrate, it is possible for tips of the scrub materials 12A and 12B of the respective cleaning brushes 10A and 10B to uniformly contact the surface to be cleaned of the cleaning target substrate while the cleaning target substrate is subjected to cleaning. In addition, if it is designed such that the cleaning brush is moved from a position after the correction towards the cleaning target substrate by a distance corresponding to a predetermined depth of compression, it is possible to suppress a variation of depth of compression against the cleaning target substrate due to a difference in models. Therefore, a variation of the cleaning effect within a plane to be cleaned of the cleaning target substrate can also be suppressed, thereby achieving a favorable cleaning performed uniformly onto the surface to be cleaned of the cleaning target substrate.

In order to confirm the above effect, two substrates (width 730 mm) placed under the same circumstances, are subjected to scrub cleaning so that one is cleaned by the cleaning brush before the position correction relating to the present embodiment is applied, and the other is cleaned with the cleaning brush after the position correction has been applied. Then, a particle removability as defined in the following equation is obtained by calculation.

PARTICLE REMOVABILITY (%)=(NUMBER OF PARTICLES BEFORE CLEANING−NUMBER OF PARTICLES AFTER CLEANING)/NUMBER OF PARTICLES BEFORE CLEANING

Here, the number of particles before cleaning indicates the particle number detected by a visual external inspection as to the substrate before cleaning. The number of particles after cleaning indicates the particle number detected by a visual external inspection as to the substrate after cleaning.

As a result of the calculation, the substance removability on the substrate which has been cleaned with the cleaning brush after the position correction was 98%. On the other hand, the substance removability on the substrate which has been cleaned with the cleaning brush before the position correction was 76%. There is such a difference because after the substrate surface was cleaned by the cleaning brush before the position correction, there still remains a part which is not cleaned yet on one side area of the substrate surface.

According to the result as described above, it has been confirmed that the surface to-be-cleaned of the cleaning target substrate can be cleaned uniformly and favorably, under the condition that the position correction of the cleaning brush is carried out in advance. In the present embodiment, the position correction is performed firstly for the upper side cleaning brush 10A, and next, the lower side cleaning brush 10B. However, even if the position correction is performed in the inverse order, i.e., firstly for the lower side brush 10B and secondly for the upper side brush 10A, the same effect can be obtained. If another substrate for adjustment is used, which has conductor patterns formed on both sides, electrical potential measurement devices may be connected respectively with the conductor patterns on both sides. Then, the same effect can be obtained even when the position correction is simultaneously performed for both of the two cleaning brushes 10A and 10B.

In the description above, the position correction of the cleaning brushes 10A and 10B is performed by use of the substrate for adjustment, prior to performing the cleaning process on the cleaning target substrate. If a conductor pattern is formed as a TEG (Test Element Group) on the cleaning target substrate, it is possible to perform the position correction of the cleaning brushes 10A and 10B in the course of performing the cleaning process on the cleaning target substrate. Hereinafter, there will be explained a case where the position correction of the cleaning brushes 10A and 10B is carried out in the course of cleaning process on the cleaning target substrate. Here, an example will be explained where a substrate on which four panels are arranged within a plane on one side is used as a cleaning target substrate.

Figure 7:
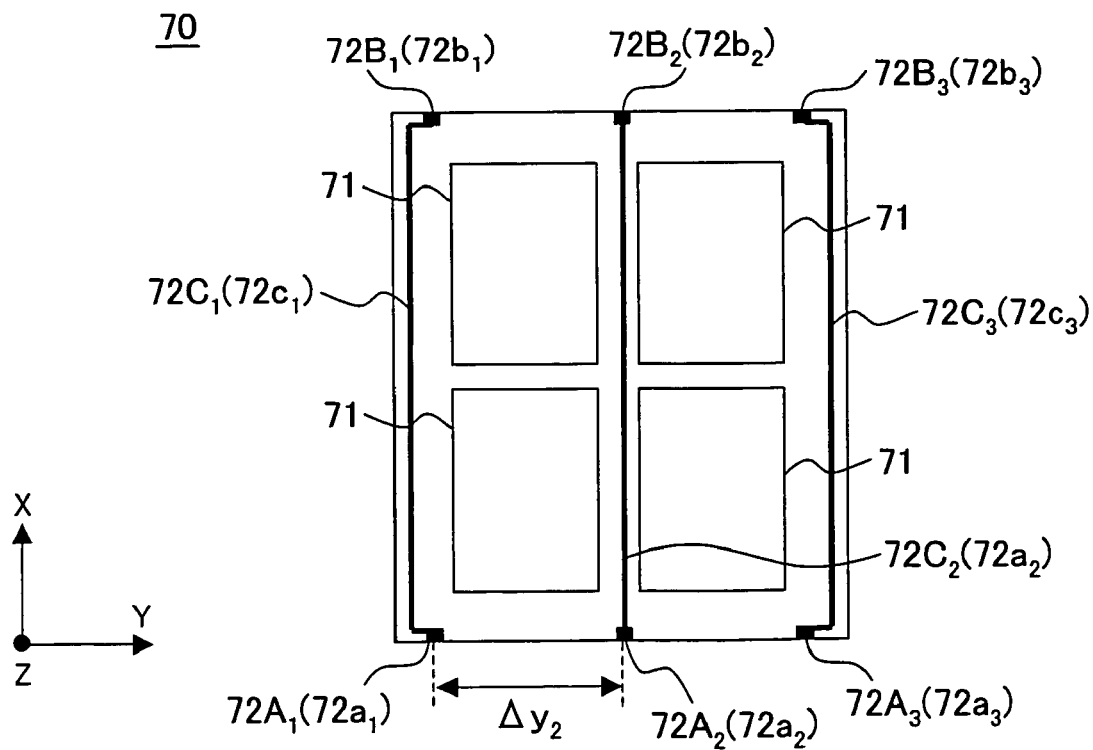
FIG. 7 is a front view of a cleaning target substrate for explaining a specific embodiment of the present invention.
Figure 8:
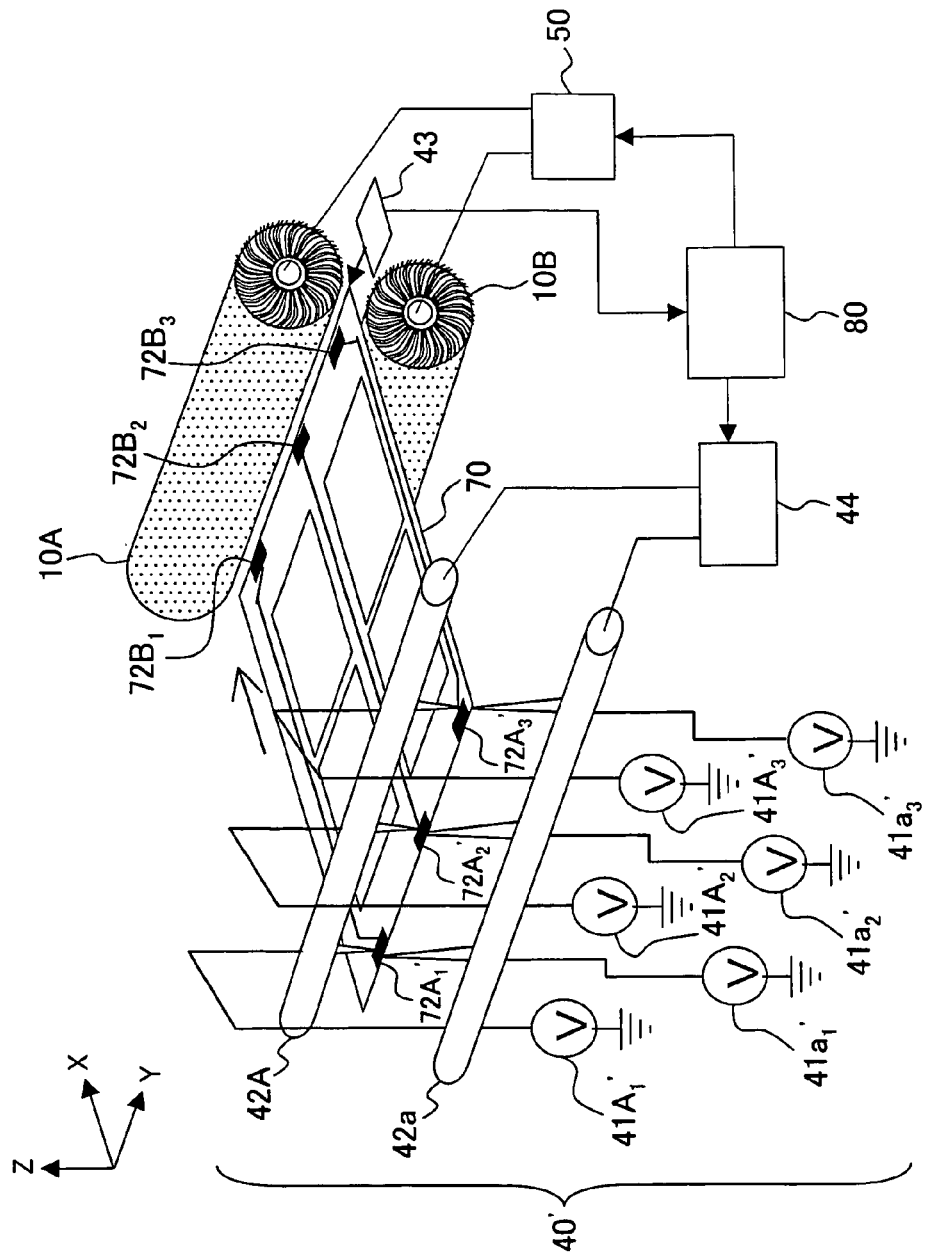
FIG. 8 is a schematic diagram showing a configuration of the cleaning apparatus for explaining a specific embodiment of the present invention.

FIG. 7 shows a cleaning target substrate 70 and FIG. 8 shows a schematic configuration of the cleaning apparatus for cleaning the cleaning target substrate 70. For ease of explanation, the thickness direction of the cleaning target substrate 70 is defined as Z-direction, and the two width directions of the cleaning target substrate 70 are defined as X-direction and Y-direction. FIG. 8 also defines the same three directions XYZ.

In the plane on one side of the cleaning target substrate 70, a plurality of pads $72B_1$ to $72B_3$ and $72A_1$ to $72A_3$ which are arranged at appropriate intervals of $\Delta Y_2$ along the Y-direction in margin areas which are opposed to each other. In addition, wiring patterns $72C_1$ to $72C_3$ are also formed, connecting the corresponding pads, around panel arranged areas 71. It is sufficient that the material forming the patterns $72A_1$ to $72A_3$, $72B_1$ to $72B_3$ and $72C_1$ to $72C_3$ is the same as that of the conductor pattern on the substrate for adjustment 10. Though it is not shown in FIG. 7, there are also formed on the other surface of the cleaning target substrate 70, similar pads $72a_1$ to $72a_3$, $72b_1$ to $72b_3$, and wiring patterns $72c_1$ to $72c_3$.

In addition, FIG. 7 shows the cleaning target substrate 70 having three pads on each of the opposed margin areas, but further pads may be formed between those pads. If it is not necessary to determine, based on the output from the electrical potential measurement device, a replacement timing and the like as to the cleaning brush 10A or 10B in the course of cleaning process, the pads $72A_2$, $72a_2$, $72B_2$ and $72b_2$ positioned in the middle of the three pads may be removed.

As shown in FIG. 8, the cleaning apparatus for cleaning such a cleaning target substrate 70 as described above comprises a substrate carrier mechanism (not illustrated) for carrying the cleaning target substrate 70 into the X-direction, a pair of roll-type cleaning brushes 10A and 10B vertically arranged with a space for allowing the cleaning target substrate 70 to pass through, a brush drive mechanism 50 which rotates and moves each of the cleaning brushes 10A and 10B, a contact detecting section 40' which detects one-sided contact of the cleaning brushes 10A, 10B against the cleaning target substrate 70, and an information processing unit 80 which controls the cleaning apparatus entirely.

Since in this embodiment, the substrate carrier mechanism, the roll-type cleaning brushes 10A and 10B, and the brush drive mechanism 50 are the same as those shown in FIG. 1 and FIG. 2, specific configurations thereof shall not be tediously illustrated or explained.

The contact detecting section 40' comprises a position sensor 43 which detects the front end of the cleaning target substrate 70 having reached between the cleaning brushes 10A and 10B, a vertically provided pair of probes 42A and 42a having conductive styluses respectively opposed to the pads $72A_1$ to $72A_3$, $72a_1$ to $72a_3$ on the rear end (the end opposed to the front end) of the cleaning target substrate 70 when the front end (the forward end of the substrate in the moving direction) of the moving cleaning target substrate 70 has reached the position between the cleaning brushes 10A and 10B, a probe moving mechanism 44 which reciprocates the probes 42A and 42a in the Z-direction, and, electrical potential measurement devices $41A_1'$ to $41A_3'$, $41a_1'$ to $41a_3'$ which are respectively connected to the styluses of the probes 42A and 42a. Here, the probes 42A and 42a are arranged in such a manner as separated from the cleaning brushes 10A and 10B, at a backward position with respect to the moving direction of the substrate, so as to prevent the styluses of the probes 42A and 42a from coming into contact with cleaning liquid.

Figure 13:
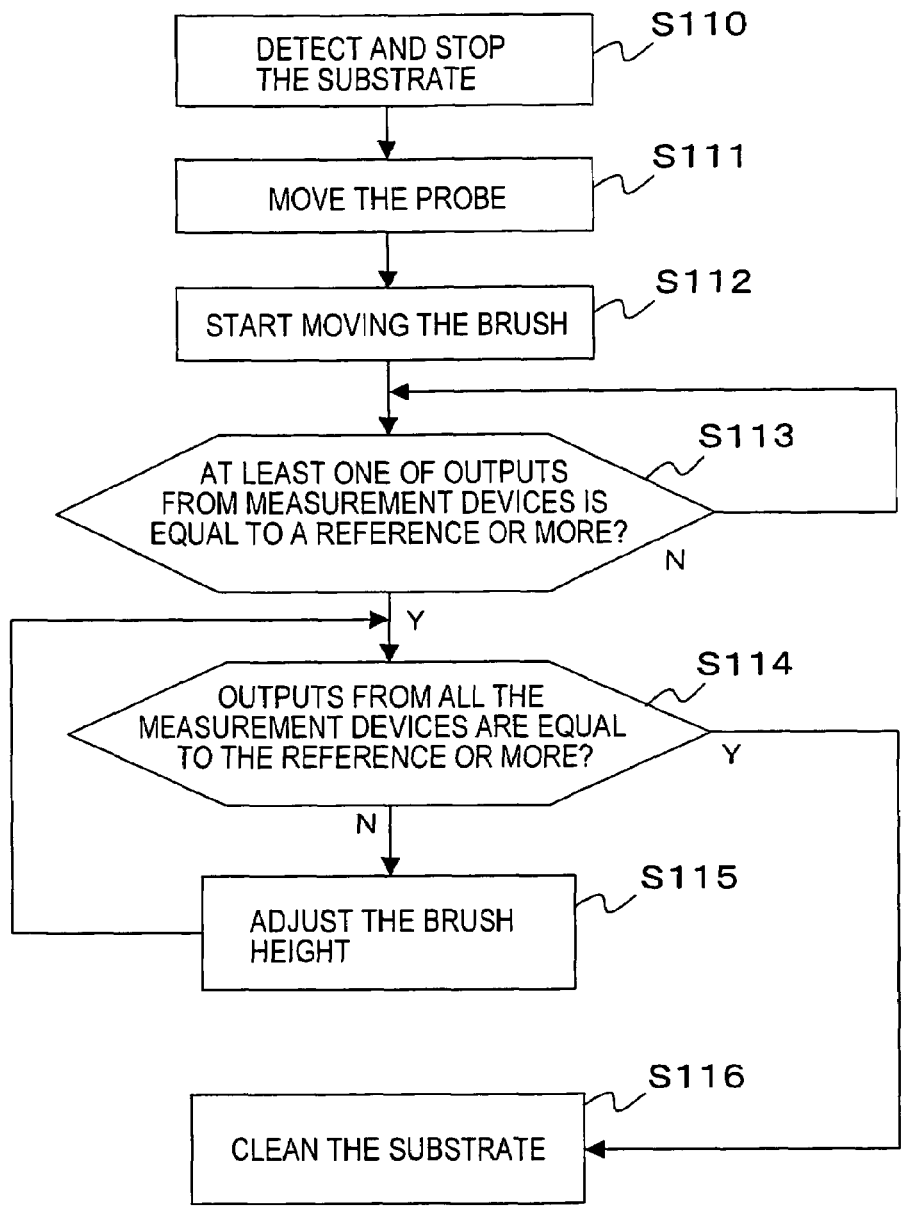
FIG. 13 is a flowchart showing a method regarding the position correction process relating to the specific embodiment of the present invention.

In the cleaning apparatus as describe above, the processes as shown in FIG. 13 are performed under the control of the information processing unit 80, in the course of cleaning the cleaning target substrate 70.

When the front end of the cleaning target substrate 70 being carried is detected by the position sensor 43, the information processing unit 80 controls the substrate moving mechanism and temporarily stops the cleaning target substrate 70 (S110). Accordingly, a line of pads $72B_1$ to $72B_3$, $72b_1$ to $72b_3$ on one end side of the cleaning target substrate 70 (hereinafter, referred to as "a front end side line of pads") is positioned between the cleaning brushes 10A and 10B, being rotating. Simultaneously, the line of pads $72A_1$ to $72A_3$, $72a_1$ to $72a_3$ on the other end side of the cleaning target substrate 70 (hereinafter, referred to as "a rear end side line of pads") is positioned between the tips of styluses of the probes 42A and 42a.

In this state of things, the information processing unit 80 controls the probe moving mechanism 44, and brings the styluses of the probes 42A, 42a into contact with the pads $72A_3$, to $72A_3$, $72a_1$ to $72a_3$ in the rear end side line of pads within both planes of the cleaning target substrate 70 (S111).

Afterwards, the information processing unit 80 controls the brush drive mechanism 50, and moves the cleaning brushes 10A and 10B towards the cleaning target substrate 70 side, until a variation of the reference range or more appears in at least one of the electrical potential measurement devices (that is, until the tip of the scrub material comes into contact with at least one of the pads in the front end line of pads $72B_1$ to $72B_3$, $72b_1$ to $72b_3$ (S112, S113).

As a result, when it is determined that a variation of the reference range or more has appeared in the detected electrical potential of all the electrical potential measurement devices $41A_1$ to $41A_3$, $41a_1$ to $41a_3$ (S114), that is, it is determined that the tips of the scrub material 12A and 12B come into contact with the entire Y-direction width of the cleaning target substrate 70, the information processing unit 80 controls the probe moving mechanism 44 and the substrate moving mechanism, so that the probes 42A and 42a are separated from the cleaning target substrate 70. Thereafter, it allows the cleaning target substrate 70 to resume moving forward. Accordingly, the cleaning target substrate 70 passes through the space between the cleaning brushes 10A and 10B being rotating, and the cleaning target substrate 70 is subjected to cleaning (S116).

On the other hand, when the information processing unit 80 determines that a variation of the reference range or more has appeared in the detected electrical potential of only a part of the electrical potential measurement devices (S114), that is, the distance between the tips of the scrub materials 12A, 12B of the cleaning brushes 10A and 10B being rotating, and the cleaning target substrate 70 is not uniform, the following processes are performed (S115).

If there is a voltage variation of the reference range or more in both of or only one of the electrical potential measurement devices $41A_2'$ and $41a_2'$ which are connected to the styluses respectively contacting with the pads $72A_2$ and $72a_2$ other than the pads $72A_1$, $72A_3$, $72a_1$ and $72a_3$ on the both ends in the rear end line of pads, or on the other hand, there is no voltage variation of the reference range or more in any of or only one of the electrical potential measurement devices $41A_2'$ and $41a_2'$, there is a possibility of deterioration (deformed, scraped away and the like) as to the scrub materials due to usage of long period of time. Therefore, the information processing unit 80 outputs an alarm by a voice, pictorial image, and the like. Accordingly, it reminds the operator that now it is the time to replace the cleaning brush or to adjust the bristles of the scrub material.

In addition, if there appears a potential variation of the reference range or more in only one of the electrical potential measurement devices $41A_1'$ and $41A_3'$ which are connected to the styluses respectively contacting with the pads $72A_1$ and $72A_3$ on the both ends in the rear end line of pads within one plane of the cleaning target substrate 70, the information processing unit 80 controls the brush moving mechanism 50 so that the adjustment of only the feed screw on the side of the pad being a connecting destination of the electrical potential measurement device where the potential variation of the reference range or more appears, is to be stopped out of the feed screws $52A_1$ and $52A_2$.

Similarly, if there appears a potential variation of the reference range or more in either one of the electrical potential measurement devices $41a_1'$ and $41a_3'$, which are connected to the styluses contacting the pads $72a_1$, $72a_3$ on both ends of the rear side line of pads within the other plane of the cleaning target substrate 70, the information processing unit 80 controls the brush moving mechanism 50, so that the adjustment of only the feed screw on the side of the pad being a connecting destination of the electrical potential measurement device where the potential variation of the reference range or more appears, is to be stopped out of the feed screws $52B_1$ and $52B_2$.

Without moving the position of one end of the cleaning brush having a contact with the cleaning target substrate 70, only the other end of the cleaning brush not having contact with the cleaning target substrate 70 yet, is further brought closer to the cleaning target substrate 70 gradually. As a result, if there appears a variation of the reference range or more in the detected potential of all the electrical potential measurement devices as the connection destinations of the styluses which are contacting all the pads on the rear end side line of pads, the information processing unit 80 controls the brush moving mechanism 50 so as to move the cleaning brushes 10A and 10B towards the cleaning target substrate 70 side, by a distance corresponding to a predetermined depth of compression from the current position (origin) of the cleaning brushes 10A and 10B. Accordingly, the depth of compression of the cleaning brushes 10A and 10B with respect to the cleaning target substrate 70 is reconfigured.

Thereafter, the information processing unit 80 controls the probe moving mechanism 44 and the substrate moving mechanism, so as to separate the probes 42A and 42B from the cleaning target substrate 70, and restart moving the cleaning target substrate 70 forward. Then, the cleaning target substrate 70 is allowed to pass through the space between the cleaning brushes 10A and 10B being rotating, and the cleaning target substrate 70 is cleaned (S115).

With the processing as described above, prior to the cleaning process for the individual cleaning target substrate, non-uniformity in the distance between the cleaning target substrate and the cleaning brush can be corrected and the depth of compression of the cleaning brush with respect to the cleaning target substrate is readjusted. Therefore, even when a plurality of cleaning target substrates are continuously cleaned, the brush moving mechanism 50 is controlled to suppress non-uniformity in cleaning among the cleaning target substrates.

In order to confirm the effect as described above, a plurality of cleaning target substrates 70 (width 730 mm) have been subjected to continuous cleaning while the position correction for the cleaning brushes 10A and 10B is performed. Then, the distance between the cleaning target substrate 70 and the cleaning brushes 10A, 10B at the origin has been measured every completion of cleaning process for 10,000 pieces of the cleaning target substrates 70. As a comparative example, without performing the position correction for the cleaning brushes 10A and 10B, a plurality of cleaning target substrates 70 (width 730 mm) have been subjected to continuous cleaning, and the distance between the cleaning target substrate 70 and the cleaning brushes 10A, 10B at the origin has been measured every completion of cleaning process for 10,000 pieces of the cleaning target substrates 70.

Figure 9:
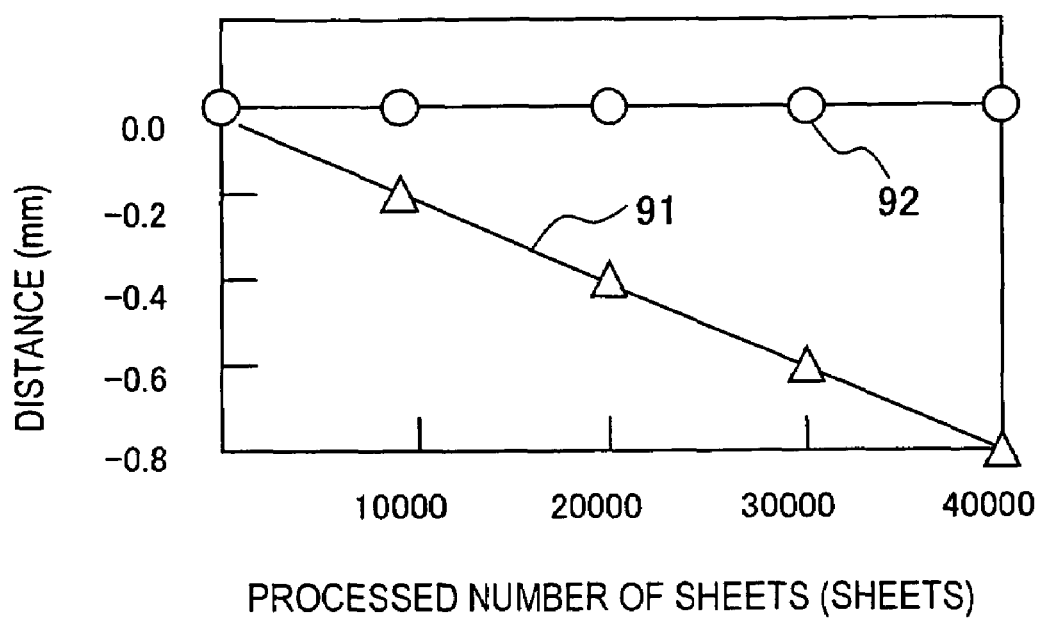
FIG. 9 is a chart for explaining an effect of position correction of the cleaning brush in the cleaning apparatus as shown in FIG. 8.

Consequently, the following results have been confirmed: as shown in the graph 91 of FIG. 9, in the case where the plurality of cleaning target substrates 70 are cleaned continuously without the position correction for the cleaning brushes 10A and 10B, the distance between the cleaning brushes 10A, 10B at the origin and the cleaning target substrate 70 becomes wider, as the number of the cleaning target substrates 70 having been cleaned becomes larger. On the other hand, in the case where the plurality of cleaning target substrates 70 are cleaned continuously while performing the position correction for the cleaning brushes 10A and 10B, as shown in the graph 92 in FIG. 9, there is generated little distance between the cleaning brushes 10A, 10B at the origin and the cleaning target substrate 70, even if the number of the cleaning target substrates 70 having been cleaned becomes larger. Namely the effect as described above have been confirmed.

Further according to the cleaning apparatus as shown in FIG. 8, it is possible to check whether or not a warp occurs on the cleaning target substrate 70 according to the following processes. The information processing unit 80 allows the rotating cleaning brush 10A having been subjected to a position correction to approach the cleaning target substrate 70 gradually, in a state that the styluses of the probe 42A abuts against the pads $72A_1$ to $72A_3$ of the cleaning target substrate 70. As a result, when there occurs a potential variation of the reference range or more at only a part of the electrical potential measurement devices, the information processing unit 80 determines that the cleaning target substrate 70 is partially contacting the cleaning brush 10A, and outputs that there occurs a warp in the cleaning target substrate 70. Furthermore, the information processing unit 80 allows the cleaning brush 10A to move further towards the cleaning target substrate 70 side. When there appears a potential variation of the reference range or more on all the electrical potential measurement devices, a distance is calculated from the current position of the cleaning brush, to the position thereof when there has appeared a potential variation of the reference range or more on only a part the electrical potential measurement devices, and the calculation result is outputted as information representing a degree of warp in the cleaning target substrate 70.

FIG. 11 shows an examination result as to the cleaning target substrate 70, having a width of 730 mm. In FIG. 11, the height of the brush indicates a larger number as the brush is separated further from the cleaning target substrate 70. "CONTACT" and "NON-CONTACT" put in the columns respectively associated with pads $72A_1$ to $72A_3$ represent that there appears or does not appear a potential variation of the reference range or more in the electrical potential measurement devices being connected with the styluses which are now brought into contact with the pads. If those examination results as shown in FIG. 11 are obtained, the information processing unit 80 outputs the information that at the position of the pad $72A_2$, the cleaning target substrate 70 is warped in convex shape towards the cleaning brush 10A side by 0.4 mm.

In the present embodiment, there have been explained two examples in which a position correction is performed for the roll-type cleaning brush. However, a slant of the rotary shaft of a disk-type cleaning brush may be corrected by a similar position correction procedure. That is, in the case where the rotary shaft of the disk-type cleaning brush is tilted with respect to a substrate surface, if the disk type cleaning brush is brought closer to the substrate surface gradually, scrub materials firstly come into contact with a predetermined area in the substrate surface. Therefore, similar to the case of the roll-type cleaning brush, the position correction can be performed by use of contact charging between the conductor of electricity formed on the substrate surface and the scrub materials.

Figure 10:
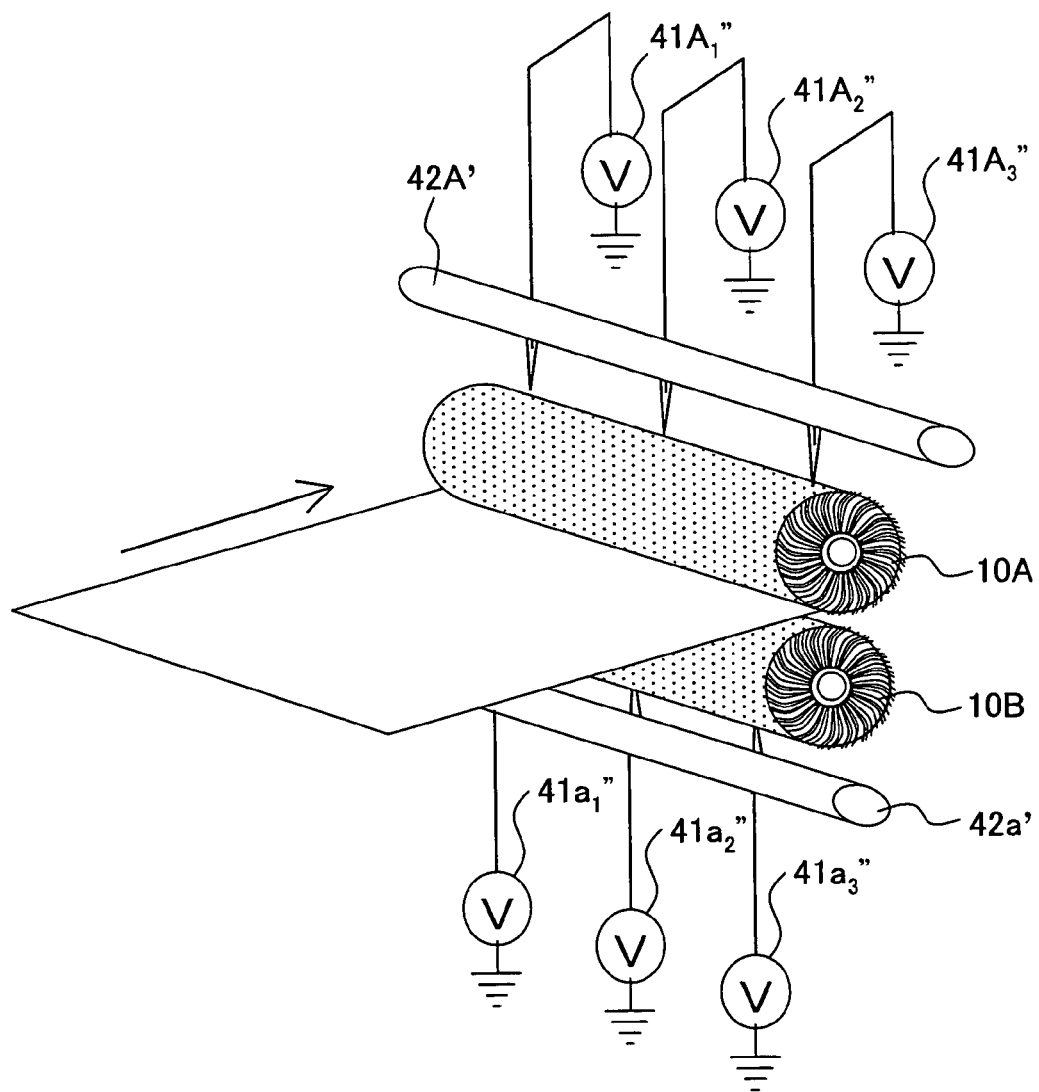
FIG. 10 is a view for explaining a method to detect a warp in the cleaning target substrate in the cleaning apparatus as shown in FIG. 8.

In the meantime, in the embodiment as described above, a replacement timing and the like as to the cleaning brush is determined by use of the contact charging between the substrate and the cleaning brush being rotating. However, such determination of replacement timing and the like as to the cleaning brush may be made by use of the contact charging between the styluses of the probe and the scrub materials of the cleaning brushes 10A and 10B. If this is the case, for example, as shown in FIG. 10, the cleaning apparatus as shown in FIG. 8 may further be provided with a contact detection section similar to the contact detection section 40', and one probe 42A' out of the two probes 42A' and 42a' is arranged at a place where all the styluses are positioned with a predetermined distance from the shaft 11A of the cleaning brush 10A. Then, the other probe 42a' is arranged at a place where all the styluses are positioned with a predetermined distance from the shaft 11b of the cleaning brush 10B.

Then, the information processing unit 80 may allow the probes 42A' and 42a' to move towards the cleaning brush 10A, 10B side, respectively, until a potential variation of the reference range or more appears on at least one electrical potential measurement device with respect to each of the cleaning brushes 10A and 10B (until at least one of the styluses of either of the probe 42A' or 42a' comes into contact with the cleaning brush 10A or 10B), during the period for example, after cleaning of one piece of cleaning target substrate is completed until the next cleaning target substrate is detected by the sensor 43.

As a result, if there appears a variation of the reference range or more in the detected potential only from a part of the electrical potential measurement devices, out of those associated with any one of the cleaning brushes, there is a possibility of deterioration (deformed, scraped away and the like) as to the scrub materials due to usage of long period of time. Therefore, the information processing unit 80 may output an alarm by a voice, pictorial image, and the like.

Finally, a use application of the cleaning apparatus relating to the present embodiment will be explained.

Figure 14:
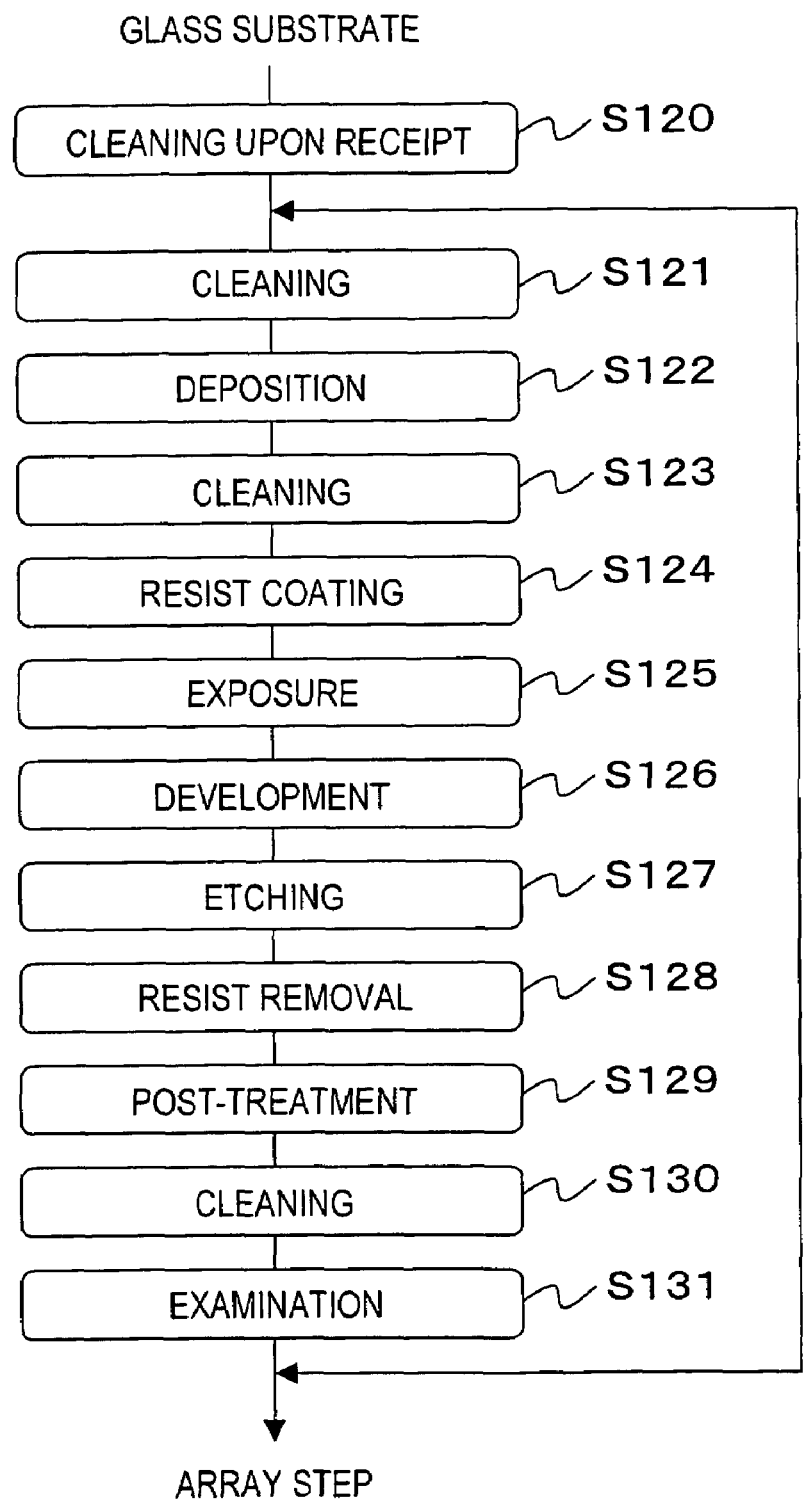
FIG. 14 is a flowchart for explaining a part of steps to manufacture a liquid crystal display device.

FIG. 14 shows a part of a manufacturing process of liquid crystal display device. This manufacturing process of the liquid crystal display device includes a plurality of cleaning steps. The cleaning apparatus relating to the present embodiment can be applied to those cleaning steps. Specifically, it can be applied to any of the steps, cleaning process step of a received substrate (S120), cleaning process step (S121) for the substrate before deposition process (S122), cleaning process step (S123) for the substrate before photolithography step (S124 to S129), and cleaning step (S130) prior to examination step (S131).

When the cleaning apparatus relating to the present embodiment is applied to the cleaning step in the manufacturing process of the liquid crystal display device, it is possible to clean the substrate uniformly and favorably, thereby enhancing yield in the manufacturing process of the liquid crystal display device. It is to be noted that the cleaning apparatus relating to the present embodiment can be applied not only to the manufacturing process for the liquid crystal display device, but also to other manufacturing process for any type of product, as far as it includes a substrate cleaning process.

As thus described above, some examples to apply the present invention to a cleaning apparatus have been described. However, the present invention can also be applied to an apparatus other than the cleaning apparatus, as far as it is a surface treatment apparatus for treating a substrate surface with a rotary member. For example, it can be applied to a rubbing device and the like which perform rubbing process on the substrate surface with a roller being wound by a raised fabric material.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. A method of treating a liquid crystal display device, comprising:
   a measurement process comprising:
      providing a rotating member having a shaft and a plurality of bristles extending radially from a surface of said shaft,
      providing a substrate adjustment member having a first conductor pattern and a second conductor pattern arranged within a first plane of said substrate adjustment member, and
      simultaneously measuring electrical potentials of each of said first and said second conductor patterns by moving said substrate adjustment member in an upward direction towards said rotating member, wherein said first and said second conductor patterns are electrically charged by making contact with the plurality of bristles of said rotating member;
   a correction process which changes a position of said rotating member with respect to said first plane, when the measured electrical potentials of said first conductor pattern or said second conductor pattern equals or exceeds a reference electrical potential range, while said rotating member is moving; and
   a substrate surface treatment process which allows, after said correction process is performed, said rotating member and said liquid crystal display device to come into contact with each other, and simultaneously moves said rotating member and said liquid crystal display device, so as to perform a surface treatment on said liquid crystal display device.

2. The method of treating a liquid crystal display device according to claim 1, wherein said surface treatment is performed after said rotating member has been moved by a distance corresponding to a predetermined depth of compression.

3. A method of treating a liquid crystal display device, comprising:
   a step of contacting a liquid crystal display device to a plurality of bristles extending radially from a shaft of a rotating member and performing a surface treatment on said liquid crystal display device,
   wherein, said step includes a process which moves a probe, having a plurality of conductor members arranged along a rotary axis of said rotating member, in a direction towards said rotating member, and simultaneously measures electrical potentials being generated by contacting the plurality of conductor members with said plurality of bristles of said rotating member.

* * * * *